United States Patent
Takagi

(10) Patent No.: US 11,327,768 B2
(45) Date of Patent: May 10, 2022

(54) ARITHMETIC PROCESSING APPARATUS AND MEMORY APPARATUS

(71) Applicant: FUJITSU LIMITED, Kawasaki (JP)

(72) Inventor: Noriko Takagi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 407 days.

(21) Appl. No.: 16/706,900

(22) Filed: Dec. 9, 2019

(65) Prior Publication Data
US 2020/0183702 A1    Jun. 11, 2020

(30) Foreign Application Priority Data

Dec. 10, 2018  (JP) .............................. JP2018-231101

(51) Int. Cl.
| | |
|---|---|
| G06F 12/08 | (2016.01) |
| G06F 9/38 | (2018.01) |
| G06F 9/30 | (2018.01) |
| G06F 12/0802 | (2016.01) |

(52) U.S. Cl.
CPC .......... G06F 9/3869 (2013.01); G06F 9/3001 (2013.01); G06F 12/0802 (2013.01)

(58) Field of Classification Search
CPC .................................................. G06F 12/0802
See application file for complete search history.

(56) References Cited

U.S. PATENT DOCUMENTS

| | | | |
|---|---|---|---|
| 6,629,206 B1 | 9/2003 | Johnson | |
| 2001/0008009 A1* | 7/2001 | Johnson | G06F 12/0864 711/3 |
| 2006/0236074 A1* | 10/2006 | Williamson | G06F 12/1054 711/E12.063 |
| 2012/0303897 A1* | 11/2012 | Pullagoundapatti | G06F 12/0864 711/171 |
| 2015/0347308 A1* | 12/2015 | Venkumahanti | G06F 9/3851 711/120 |

FOREIGN PATENT DOCUMENTS

| | | |
|---|---|---|
| JP | 2003-150446 A | 5/2003 |
| JP | 2003-519836 A | 6/2003 |
| WO | WO01/050273 A1 | 7/2001 |

* cited by examiner

*Primary Examiner* — Chuong D Ngo
(74) *Attorney, Agent, or Firm* — Fujitsu Patent Center

(57) ABSTRACT

An arithmetic processing apparatus includes an arithmetic circuit configured to perform an arithmetic operation on data having a first data width and perform an instruction in parallel on each element of data having a second data width, and a cache memory configured to store data, wherein the cache memory includes a tag circuit storing tags for respective ways, a data circuit storing data for the respective ways, a determination circuit that determines a type of an instruction with respect to whether data accessed by the instruction has the first data width or the second data width, and a control circuit that performs either a first pipeline operation where the tag circuit and the data circuit are accessed in parallel or a second pipeline operation where the data circuit is accessed in accordance with a tag result after accessing the tag circuit, based on a result determined by the determination circuit.

10 Claims, 13 Drawing Sheets

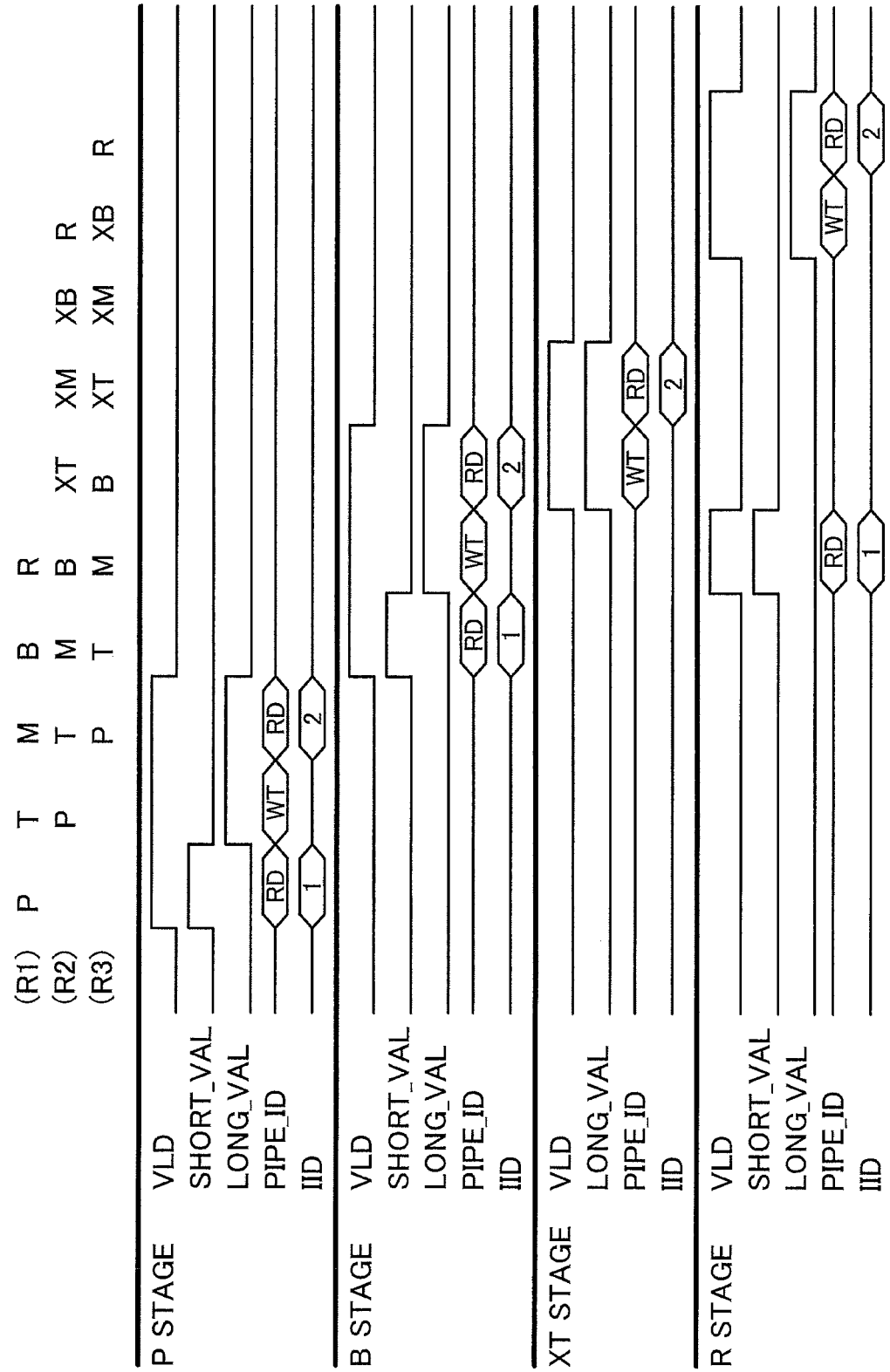

ARITHMETIC PROCESSING APPARATUS AND MEMORY APPARATUS

CROSS-REFERENCE TO RELATED APPLICATIONS

The present application is based upon and claims the benefit of priority from the prior Japanese Patent Application No. 2018-231101 filed on Dec. 10, 2018, with the Japanese Patent Office, the entire contents of which are incorporated herein by reference.

FIELD

The disclosures herein relate to an arithmetic processing apparatus, a memory apparatus, and a method of controlling the arithmetic processing apparatus.

BACKGROUND

A recent general purpose processor generally has a cache memory (which will be hereinafter simply referred to as a cache) in a processor core for storing operands and instructions. Storing frequently accessed data in a cache inside a core that can be accessed in short latency, can shorten a length of time to access a memory, and can improve performance of a processor.

A cache memory has a data storage area therein corresponding to each index of a plurality of indexes. A predetermined number of lower bits among all bits of an access address are used as an index, and data at the access address is stored in the data storage area corresponding to the index.

As a cache placement method, a set associative method, which has a good balance between a cache hit ratio (which is a probability that an accessed data is stored in a cache) and complexity of a cache structure, is often used. The set associative method groups a plurality of blocks that are independent data storage areas in a cache into a set, and associates one of the sets to one of the indexes. For a given index, a plurality of data in a memory space corresponding to the given index is stored in corresponding blocks in a set associated with the index. Each block among blocks in a set has its cache tag (which will be simply referred to as a tag). For a given block, the tag of the given block stores upper bits of all bits of an access address corresponding to data stored in the given block.

Each block included in a set is called a cache way or a way, and the number of ways included in a block is called a way number. An index is an identifier of a set. A set associative cache includes a data circuit that stores data, and a tag circuit that records information indicating which data is stored in a way of an index, for each way and each index.

The cache is normally a hierarchical structure inside and outside a core, and a cache directly connected to an arithmetic circuit is called an L1 (i.e., Level 1) cache. In an L1 cache that uses a set associative method, a data circuit and a tag circuit are accessed simultaneously, and while data of all ways corresponding to an index are read from the data circuit, data is selected by a way number determined by searching in the tag circuit. A parallel execution of accessing a data circuit and a tag circuit can shorten latency of accessing an L1 cache.

SIMD (Single Instruction Multiple Data) is one of the methods for improving performance of a processer. SIMD is a method that enables a parallel operation of an instruction by performing an instruction on a plurality of data in parallel, which achieves a high performance improvement mainly in the field of high performance computing. A SIMD width (i.e., the number of data which can be processed simultaneously) that can be supported by a general purpose processor has been on an increase, and a general purpose processor that supports 64 bytes width SIMD operations has appeared recently. An amount of data that an arithmetic circuit needs for one operation is increased with an increase of a SIMD width, and an L1 cache, which provides data, is required to achieve a higher throughput. For example, when a processor supports 64 bytes as a maximum SIMD width, load and store instructions are also SIMD instructions, and are required to read 64 bytes data from an L1 cache every cycle.

A method of parallel execution of searching in a tag circuit and reading data of all ways during reading from an L1 cache requires reading data equivalent to the size obtained by multiplying a SIMD width and a way number at one time. For example, when an L1 cache is for a 64 bytes SIMD width and four ways, a necessary data width for reading from a data circuit of a cache at one time is 256 bytes. In order to increase a data width for reading at one time, the number of RAM macros (Random Access Memory macros) that implements an L1 cache is necessary to be increased, which causes an increase of the number of RAM macros that run simultaneously, and causes a significant increase in an area and electric power. An area and electric power occupied by an L1 cache account for a significant portion in a processor core, and an increase of an area and electric power of an L1 cache is unfavorable for a processor.

The problem described above can be solved by searching in a tag circuit in advance, and reading data of the only one way selected from a data circuit (e.g., Patent Documents 1 and 2). However, this method performs searching in a tag circuit and reading from a data circuit sequentially, and latency is increased. The increase of latency does not significantly influence performance of a program for which SIMD is effective because of a high degree of data parallelism, but greatly influences performance of a program for which SIMD cannot be used or for which SIMD can only be used with a short SIMD width because of a low degree of data parallelism.

It is preferable that a general purpose processor produces good performance for various types of programs. Thus, it is preferable that an L1 cache achieves both high throughput of a large SIMD width access and short latency of a small SIMD width access or non-SIMD access while an increase in an area and electric power is suppressed.

RELATED-ART DOCUMENTS

Patent Document

[Patent Document 1] Japanese Laid-Open Patent Publication No. 2003-150446
[Patent Document 2] Japanese National Publication of International Patent Application No. 2003-519836

SUMMARY

According to an aspect of the embodiment, an arithmetic processing apparatus includes an instruction issue circuit configured to issue an instruction, an arithmetic circuit configured to perform an arithmetic operation on data having a first data width and perform an instruction in parallel on each element of data having a second data width that is larger than the first data width, and a cache memory configured to store data, wherein the cache memory includes a tag circuit configured to store a plurality of tags for a plurality of respective ways, a data circuit configured to store a plurality of data for the plurality of respective ways, a determination circuit configured to determine a type of the instruction with respect to whether data accessed by the instruction that the instruction issue circuit issues has the first data width or the second data width, and a control circuit configured to selectively perform either a first pipeline operation in which the tag circuit and the data circuit are accessed in parallel or a second pipeline operation in which the data circuit is accessed in accordance with a tag determination result after accessing the tag circuit, on a basis of a result determined by the determination circuit.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 13 is a timing chart illustrating transition of data stored in pipeline control registers.

DESCRIPTION OF EMBODIMENTS

In the following, embodiments of the present invention will be described with reference to the accompanying drawings.

Figure 1:
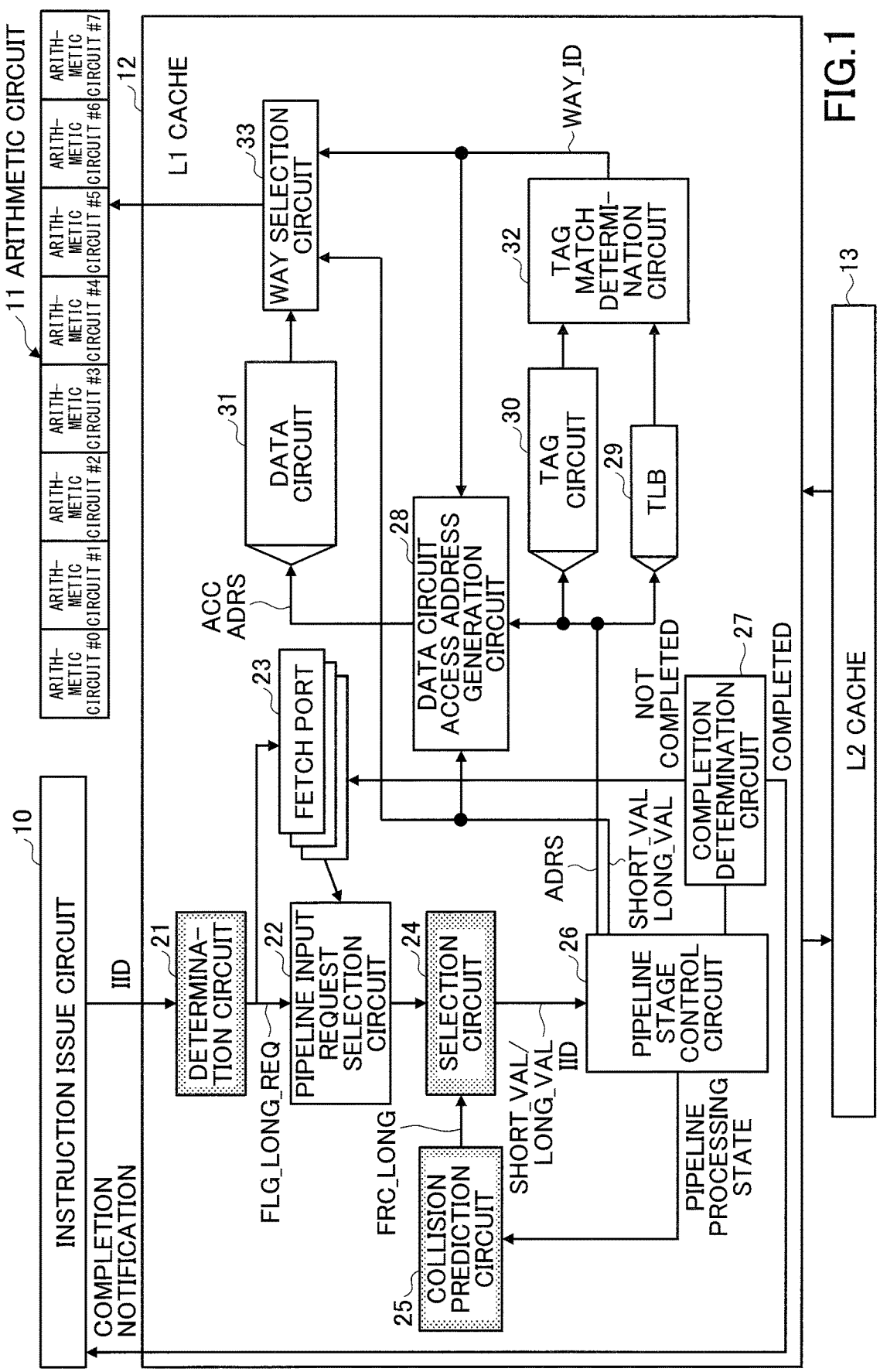
FIG. 1 is a drawing illustrating an example of the configuration of an arithmetic processing system.

FIG. 1 is a drawing illustrating an example of the configuration of an arithmetic processing system. The arithmetic processing system illustrated in FIG. 1 includes an instruction issue circuit 10, an arithmetic circuit 11, a cache memory 12 that is an L1 cache, and a cache memory 13 that is an L2 cache. A main storage device (which is not illustrated) is further connected to the cache memory 13. A part including the instruction issue circuit 10, the arithmetic circuit 11, and the cache memory 12 is an arithmetic processing apparatus, and the arithmetic processing apparatus performs arithmetic operations based on data that is read from the main storage device and that is temporarily stored in the cache memory 12 through the cache memory 13.

In FIG. 1, boundaries between functional blocks illustrated as boxes basically indicate functional boundaries, and may not correspond to separation of physical positions, separation of electrical signals, separation of control logic, etc. Each functional block may be a hardware module that is physically separated from other blocks to some extent, or may indicate a function in a hardware module in which the block and other blocks are physically combined together.

The instruction issue circuit 10 decodes an instruction included in a series of an instruction sequence and issues a request (i.e., a request for executing an instruction) based on a decoded result. The request to be issued includes data indicating a type of the instruction and may be identified by an instruction identifier IID. A request of a memory access instruction, such as a load instruction and a store instruction, that the instruction issue circuit 10 issues, is provided to the cache memory 12 with an access address.

A request of an arithmetic instruction that the instruction issue circuit 10 issues is provided to the arithmetic circuit 11. The arithmetic circuit 11 can perform an operation on data of a first data width, and can perform an instruction in parallel on each element of data of a second data width that is larger than a first data width. Specifically, the arithmetic circuit 11 includes eight arithmetic circuits from a zeroth arithmetic circuit to a seventh arithmetic circuit so as to be capable of a SIMD operation. The number of arithmetic circuits illustrated in FIG. 1 is an example, and the number of arithmetic circuits is not limited to a specific number. Each arithmetic circuit from the zeroth arithmetic circuit to the seventh arithmetic circuit may be designed to perform an operation on data of the first data width. When a normal operation is performed, the zeroth arithmetic circuit may perform a desired operation corresponding to a request from the instruction issue circuit 10, on data of the first data width, for example. When a SIMD operation is performed, the arithmetic circuits from the zeroth arithmetic circuit to the seventh arithmetic circuit may perform an instruction in parallel on each element of data obtained by dividing data of the second data width that is larger than the first data width. For example, each arithmetic circuit among the arithmetic circuits from the zeroth arithmetic circuit to the seventh arithmetic circuit may perform the same instruction corresponding to a request that the instruction issue circuit 10 issues, on a corresponding data element of eight data elements in parallel. A width of each data element on which an operation is performed may be the first data width. For example, the first data width may be 16 bytes, and the second data width may be 64 bytes, however the first data width and the second data width are not limited to a specific width.

The cache memory 12 illustrated in FIG. 1 includes a determination circuit 21, a pipeline input request selection circuit 22, a fetch port 23, a selection circuit 24, a collision prediction circuit 25, a pipeline stage control circuit 26, a completion determination circuit 27, and a data circuit access address generation circuit 28. The cache memory 12 further includes a TLB (Translation Look-aside Buffer) 29, a tag circuit 30, a data circuit 31, a tag match determination circuit 32, and a way selection circuit 33.

The tag circuit 30 stores a plurality of tags (e.g., 4 tags) corresponding to a plurality of ways (e.g., 4 ways) for each index. The data circuit 31 stores a plurality of data (e.g., 4 pieces of data) corresponding to a plurality of ways (e.g., 4 ways) for each index. The cache memory 12 is designed to be able to selectively perform a first pipeline operation in which the tag circuit 30 and the data circuit 31 are accessed in parallel, or a second pipeline operation in which the data circuit 31 is accessed in accordance with a tag determination result after the tag circuit 30 is accessed. In the first pipeline operation, when the tag circuit 30 and the data circuit 31 are accessed in parallel, operations of reading from the tag circuit 30 and from the data circuit 31 may be performed at the same time, or at different times. The first pipeline operation is different from the second pipeline operation in reading from the data circuit 31 without waiting for a tag determination result.

Figure 2:
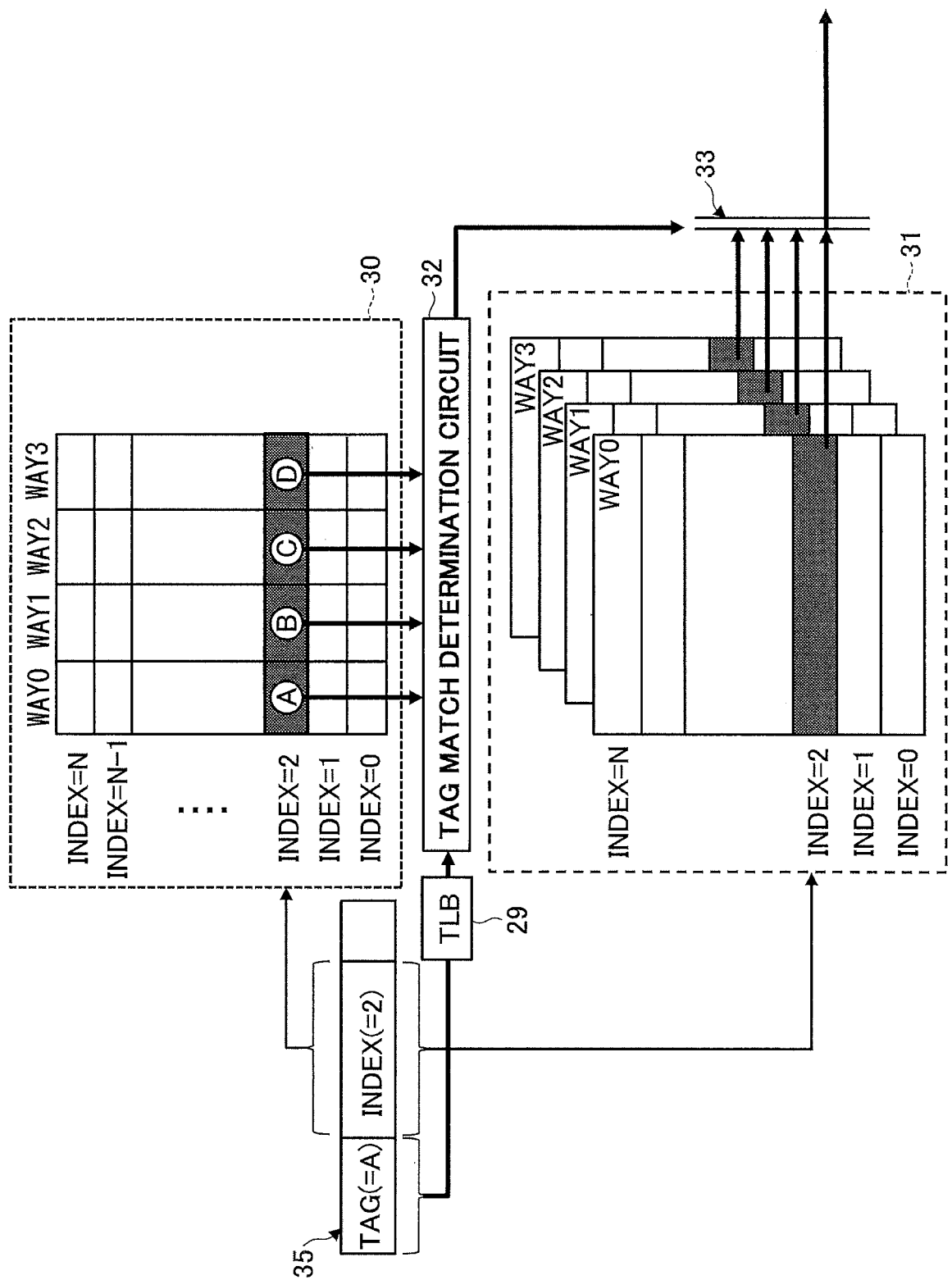
FIG. 2 is a drawing illustrating an overview of a first pipeline operation.

FIG. 2 is a drawing illustrating an overview of the first pipeline operation. In FIG. 2, an index INDEX of the access address 35 (i.e., 2 in this example) is provided to the tag circuit 30 and the data circuit 31. In the tag circuit 30, tags of a plurality of ways from WAY0 to WAY3 corresponding to the index INDEX are read. In parallel with reading the tags, in the data circuit 31, data of the plurality of ways from WAY0 to WAY3 corresponding to the index INDEX is read. The number of ways is 4 in this example, however the number of ways is not limited to a specific number.

A tag TAG of the access address 35 (i.e., A in this example) is converted by the TLB 29 from a virtual address to a physical address, and is provided to the tag match determination circuit 32. The tag match determination circuit 32 compares a plurality of tags read from the tag circuit 30 with the tag TAG of the access address 35, and determines a tag that matches the tag TAG (i.e., a tag of the way WAY0 in this example). The tag match determination circuit 32 provides data indicating the matched way WAY0 to the way selection circuit 33. The way selection circuit 33 selects and outputs data corresponding to the matched way WAY0 from data of ways from the way WAY0 to the way WAY3 read from the data circuit 31.

Figure 3:
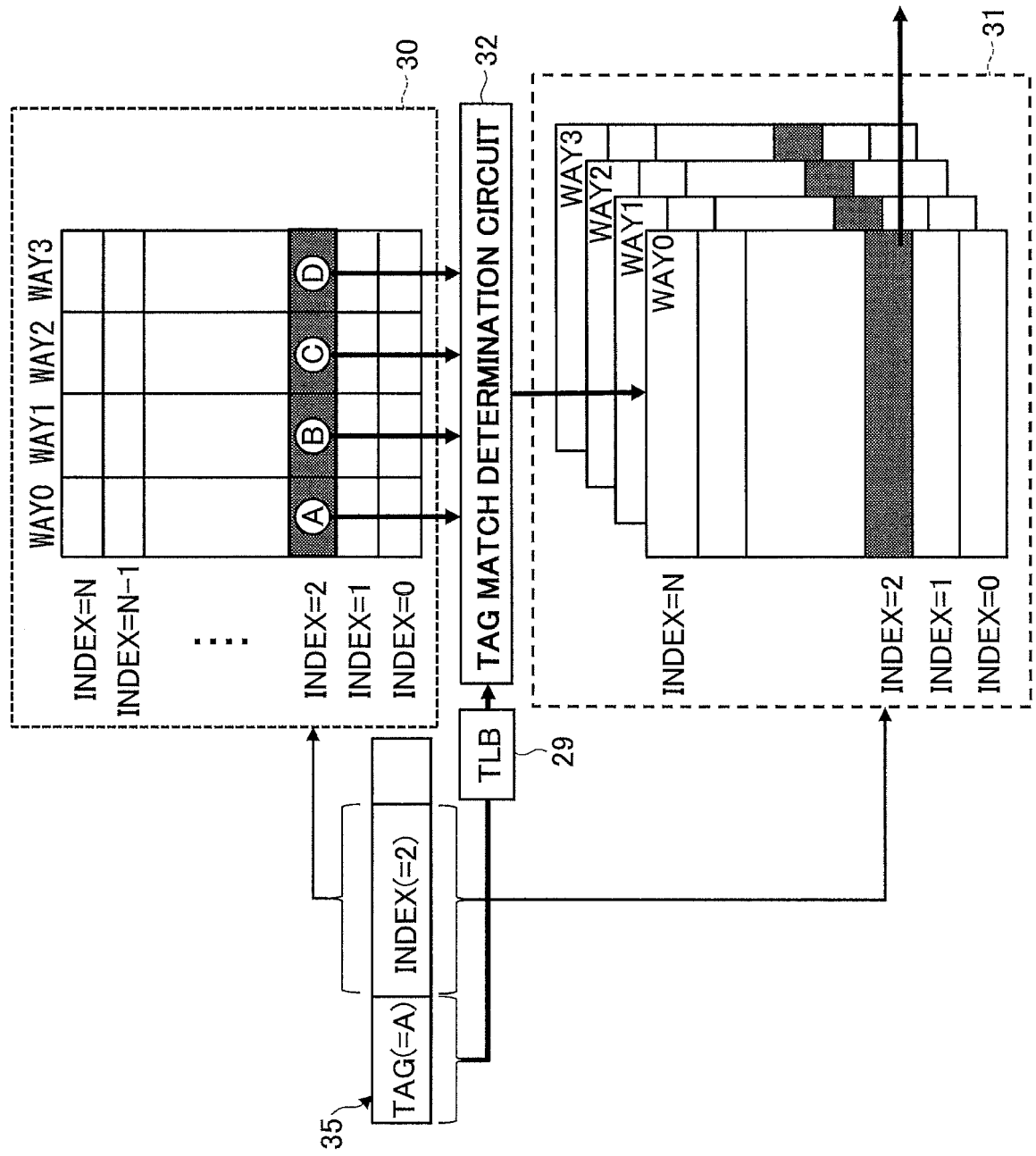
FIG. 3 is a drawing illustrating an overview of a second pipeline operation.

FIG. 3 is a drawing illustrating an overview of the second pipeline operation. In FIG. 3, the index INDEX of the access address 35 (i.e., 2 in this example) is provided to the tag circuit 30 and the data circuit 31. A tag TAG of the access address 35 (i.e., A in this example) is converted by the TLB 29 from a virtual address to a physical address, and is provided to the tag match determination circuit 32. In the tag circuit 30, tags of a plurality of ways from WAY0 to WAY3 corresponding to the index INDEX are read. The tag match determination circuit 32 compares a plurality of tags read from the tag circuit 30 with the tag TAG of the access address 35, and determines a tag that matches the tag TAG (i.e., a tag of the way WAY0 in this example). Subsequently, based on information about a tag determination result of the tag match determination circuit 32, data of the matched way WAY0 among a plurality of ways from the way WAY0 to the way WAY3 corresponding to the index INDEX is read from the data circuit 31.

The cache memory 12 illustrated in FIG. 1 generates an address for accessing the data circuit 31 in the first pipeline operation and the second pipeline operation by the data circuit access address generation circuit 28, which will be described later. FIG. 2 and FIG. 3, which are described above, illustrate an overview of a configuration and an operation, and do not illustrate the data circuit access address generation circuit 28.

Figure 4:
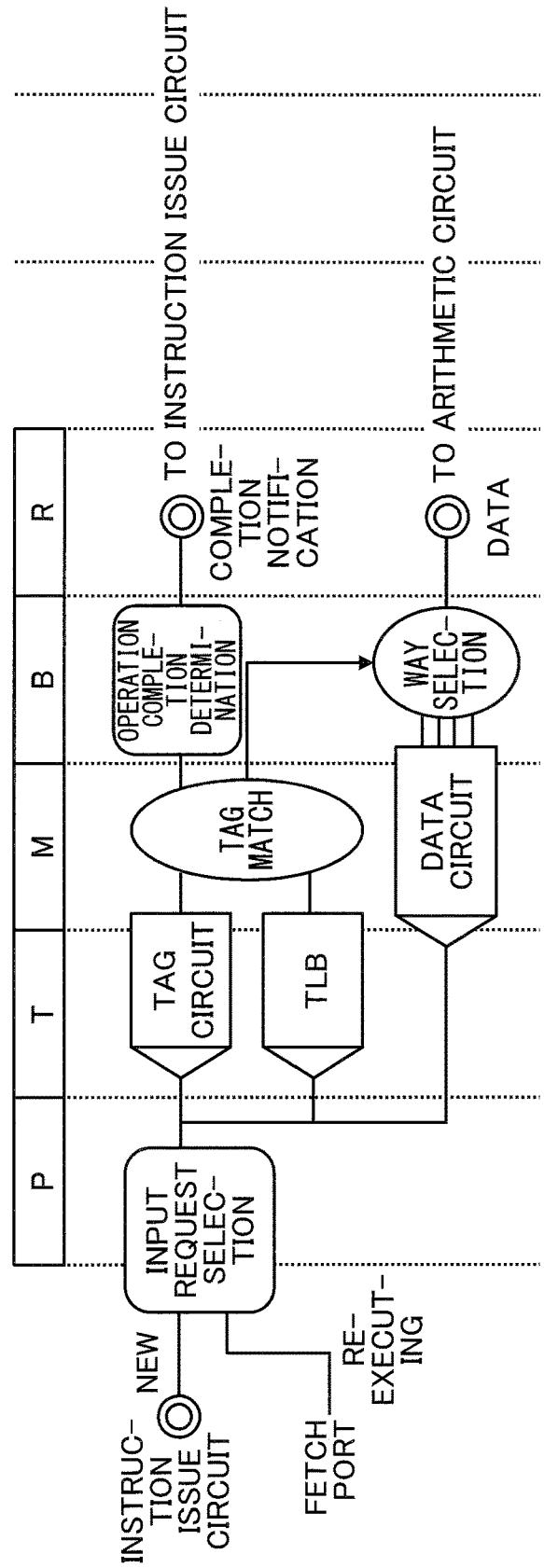
FIG. 4 is a drawing illustrating an example of an operation in each pipeline stage of a first pipeline operation.

FIG. 4 is a drawing illustrating an example of an operation in each pipeline stage of the first pipeline operation. In the stage P, a request to be input to the first pipeline is selected. Targets to be selected are requests that the instruction issue circuit 10 in FIG. 1 newly issues or requests registered in the fetch port 23 that are not executed (including a request to be re-executed), and the selection is performed by the pipeline input request selection circuit 22. In the following stage T, a reading operation from the tag circuit 30 and a converting operation of the TLB 29 are performed. In the stage M, a tag matching operation of the tag match determination circuit 32 is performed, and a reading operation from the data circuit 31 is performed. A reading operation from the data circuit 31 may be designed to be performed in the stage T.

In the stage B, an operation completion determination of the completion determination circuit 27 in FIG. 1, which will be described later, is performed, and a way selection operation of the way selection circuit 33 is performed. In the last stage R, a completion notification to the instruction issue circuit 10 and providing data to the arithmetic circuit 11 are performed. In five stages from the stage P to the stage R described above, the first pipeline operation is performed.

Figure 5:
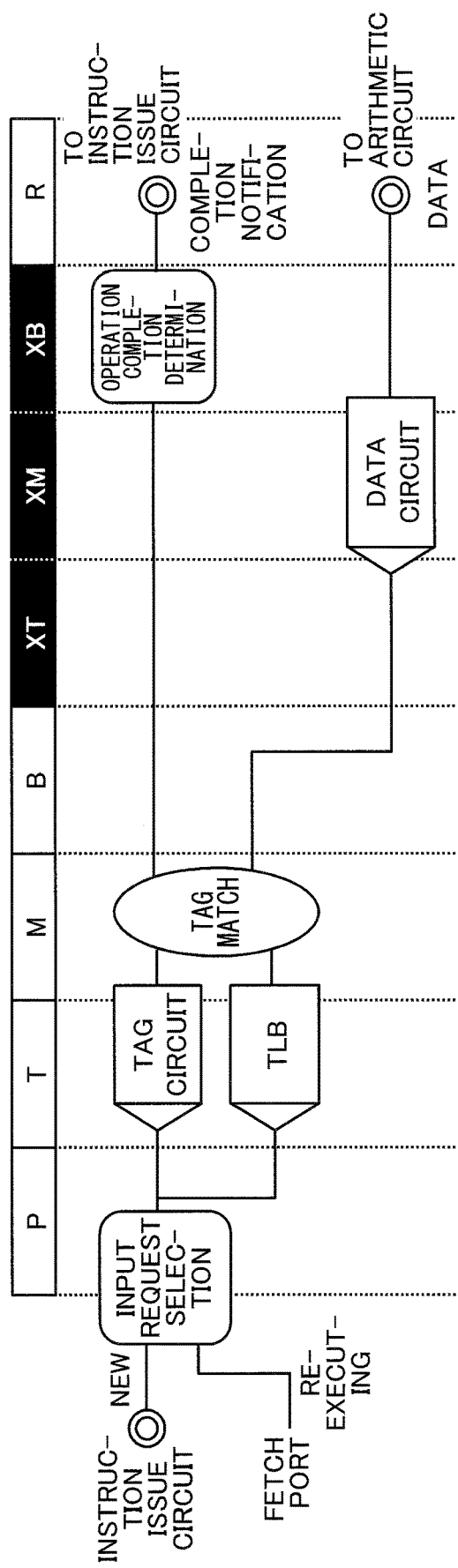
FIG. 5 is a drawing illustrating an example of an operation in each pipeline stage of a second pipeline operation.

FIG. 5 is a drawing illustrating an example of an operation in each pipeline stage of the second pipeline operation. In the stage P, a request to be input in the second pipeline is selected. In the following stage T, a reading operation from the tag circuit 30 and a converting operation of the TLB 29 are performed. In the stage M, a tag matching operation of the tag match determination circuit 32 is performed. In the following stage B and the stage XT, no operation is performed, and in the stage XM, a reading operation from the data circuit 31 is performed based on a tag determination result. The reading operation from the data circuit 31 may be designed to be performed in the stage XT, for example.

In the stage XB, an operation completion determination of the completion determination circuit 27 in FIG. 1 is performed. In the last stage R, a completion notification to the instruction issue circuit 10 and providing data to the arithmetic circuit 11 are performed. In eight stages from the stage P to the stage R described above, the second pipeline operation is performed. As data is read from the data circuit 31 in accordance with a tag determination result after the tag determination process is performed by the tag match determination circuit 32, the number of stages of the second pipeline operation is greater than the number of stages of the first pipeline operation. Thus, the second pipeline operation is longer in latency than the first pipeline operation.

Returning to FIG. 1, the determination circuit 21 determines a type of an instruction with respect to whether data accessed by the instruction that the instruction issue circuit issues is the first data width or the second data width. On a basis of the determination result, the first pipeline operation or the second pipeline operation is selected to perform the instruction. Specifically, the pipeline stage control circuit 26 performs the first pipeline operation when an instruction to be executed accesses data with the first data width, and performs the second pipeline operation when an instruction to be executed accesses data with the second data width. Thus, when an instruction accesses data with a short data width such as 16 bytes width, the tag circuit 30 and the data circuit 31 are accessed in parallel and an operation of short latency is achieved. When an instruction accesses data with a long data width such as 64 bytes width, in accordance with a tag determination result obtained by accessing the tag circuit 30, only data of a determined way is read from the data circuit 31, and an increase in an area to implement RAM and power consumption of the data circuit 31 can be suppressed.

The pipeline operation can be switched in accordance with a type of a request by the determination circuit 21 determining whether the request is a target of the first pipeline operation or a target of the second pipeline operation for each request. As a result, both high throughput of a large SIMD width access and short latency of a small SIMD width access or non-SIMD access can be achieved.

The data circuit access address generation circuit 28 generates an address to access the data circuit 31 in the first pipeline operation and the second pipeline operation. Specifically, the data circuit access address generation circuit 28 generates an address so as to access the data circuit 31 with the first data width in the first pipeline operation, and generates an address so as to access the data circuit 31 with the second data width in the second pipeline operation. For example, in the first pipeline operation, data of 16 bytes data width corresponding to each of ways may be read from the data circuit 31. In the second pipeline operation, data of 64 bytes data width of one determined way may be read from the data circuit 31. This enables reading data of an appropriate data width for each instruction from the data circuit 31 while an increase in an area and power consumption is suppressed.

Figure 6:
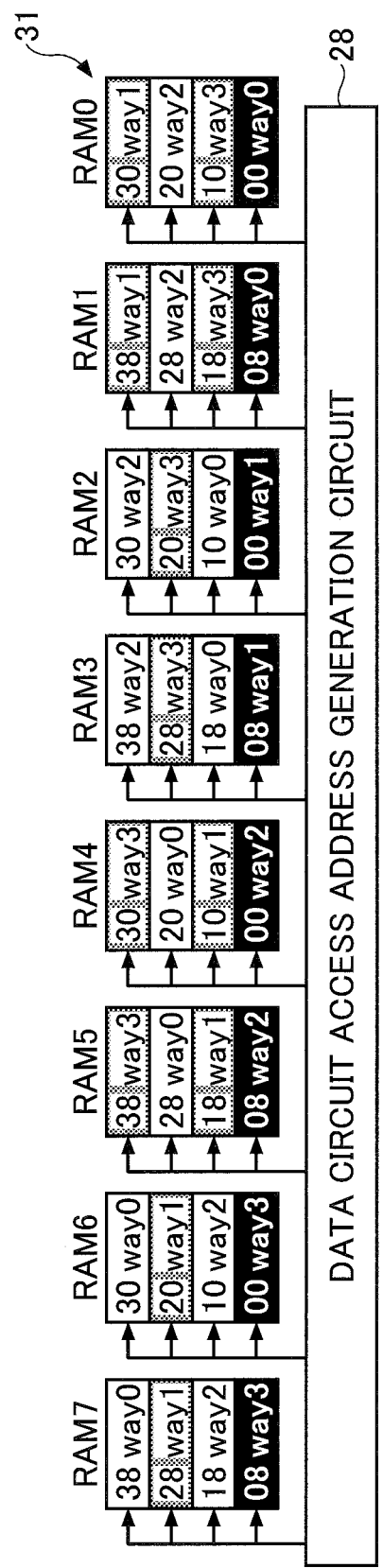
FIG. 6 is a drawing illustrating a state of reading data from a data circuit in a first pipeline operation.
Figure 7:
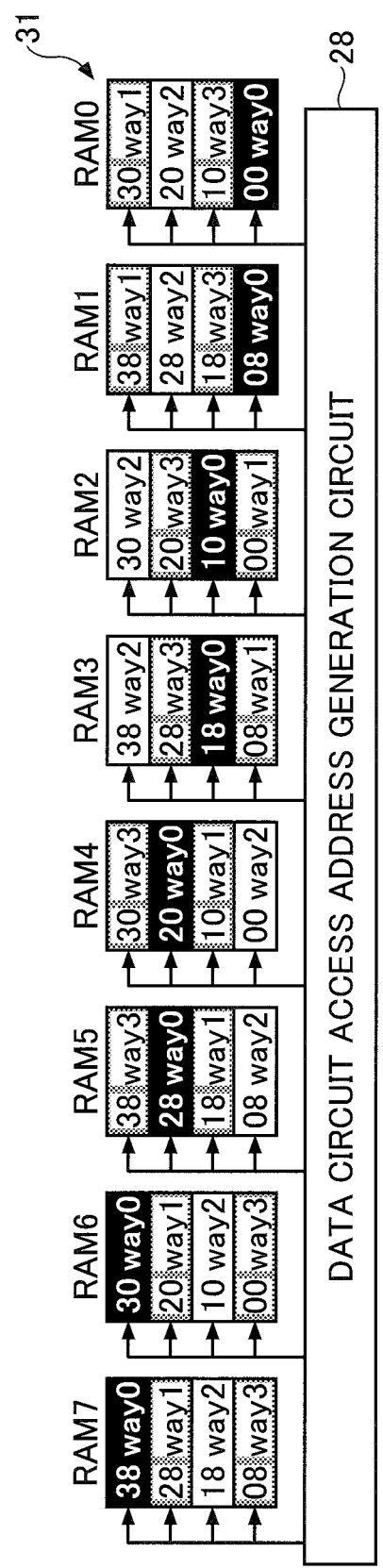
FIG. 7 is a drawing illustrating a state of reading data from a data circuit in a second pipeline operation.

FIG. 6 is a drawing illustrating a state of reading data from the data circuit 31 in the first pipeline operation. FIG. 7 is a drawing illustrating a state of reading data from the data circuit 31 in the second pipeline operation. In FIG. 6 and FIG. 7, eight 32 bytes RAMS (from RAM0 to RAM7) are provided in the data circuit 31. Each RAM can store four 8 bytes data individually. A leading number of the notation of each RAM is a byte position in hexadecimal. For example, "00way0" indicates 0th byte in the way WAY0, "08way0" indicates 8th byte in the way WAY0, and "10way0" indicates 16th byte in the way WAY0. In RAM0, for example, a storage location marked as "00way0" stores data from 0th byte to 7th byte of the way WAY0. In RAM1, for example, a storage location marked as "08way0" stores data from 8th byte to 15th byte of the way WAY0. In the data circuit 31, each way of four ways from the way WAY0 to the way WAY3 stores 64 bytes data, and four ways store 256 bytes data in total.

When the first pipeline operation described in FIG. 6 is performed, 16 bytes data from 0th byte to 15th byte is read from each way of four ways from the way WAY0 to the way WAY3. In this case, the data circuit access address generation circuit 28 generates an access address so as to read first eight bytes data in each RAM of the RAMs from the RAM0 to the RAM7.

When the second pipeline operation described in FIG. 7 is performed, 64 bytes data from 0th to 63rd byte is read from one way WAY0. In this case, the data circuit access address generation circuit 28 generates an access address so as to read 8 bytes data from a storage location of each RAM of the eight RAMs from the RAM0 to the RAM 7 where data of the way WAY0 is stored.

Returning to FIG. 1, in the first pipeline operation, the way selection circuit 33 may select and output data of a way among data of multiple ways read from the data circuit 31 in accordance with a tag determination result. In the second pipeline operation, the way selection circuit 33 may output all data of a way read from the data circuit 31. This enables outputting data with an appropriate data width for each instruction from the cache memory 12 and providing the data for an operation of the arithmetic circuit 11.

As a pipeline length is different between the first pipeline operation and the second pipeline operation, a resource collision may occur in the configuration in which there is switching between both pipeline operations. The cache memory 12 can avoid such a resource collision by the collision prediction circuit 25.

As describe above, when a determination result by the determination circuit 21 indicates that a first instruction accesses data with the first data width, that is, when a determination result indicates an execution of the first pipeline operation for the first instruction, the first pipeline operation may be performed normally. However, if the first pipeline operation executed for the first instruction would collide with the second pipeline operation executed for a second instruction previous to the first instruction, the first pipeline operation for the first instruction may not be performed for the first instruction. The collision prediction circuit 25 predicts whether the first pipeline operation to be executed for the first instruction would collide with the second pipeline operation previously executed. When collision is detected (or predicted) by the collision prediction circuit 25, the pipeline stage control circuit 26 may execute the second pipeline operation for the first instruction instead of the first pipeline operation.

In the description above, when collision is predicted, the second pipeline operation is performed for the first instruction instead of the first pipeline operation, but the first pipeline operation may be performed for the first instruction without avoiding a collision. In this case, when the collision occurs, either the first instruction or the second instruction cannot be executed, and an instruction that cannot be executed becomes a target of re-executing as an instruction that is not completed. Subsequently, the instruction is re-executed. This also can provide a desired effect of decreasing an area and electric power and shortening latency by implementing both the first pipeline operation and the second pipeline operation. However, in order to achieve an efficient pipeline processing, as described at first, when collision is predicted, it is preferable that the second pipeline operation is performed for the first instruction instead of the first pipeline operation. As described, a pipeline stall caused by a collision of operations can be prevented by predicting a collision between two pipeline operations in advance and avoiding it.

In the following, the configuration and operation of the cache memory 12 illustrated in FIG. 1 will be described in more detail.

First, a request that the instruction issue circuit 10 issues is input to the determination circuit 21. The determination circuit 21 is a circuit that outputs a flag indicating that the request is a target of a long latency pipeline operation (i.e., the second pipeline operation). The determination circuit 21 includes a table inside and the table stores whether a request is a target of the long latency pipeline operation with respect to each type of a request. When a received request is determined as a target of the long latency pipeline operation by referring to the table, the determination circuit 21 asserts a long latency request flag FLG_LONG_REQ (i.e., sets a long latency request flag FLG_LONG_REQ to 1). The determination circuit 21 provides a request and a long latency request flag FLG_LONG_REQ to the pipeline input request selection circuit 22 and the fetch port 23.

Figure 8:
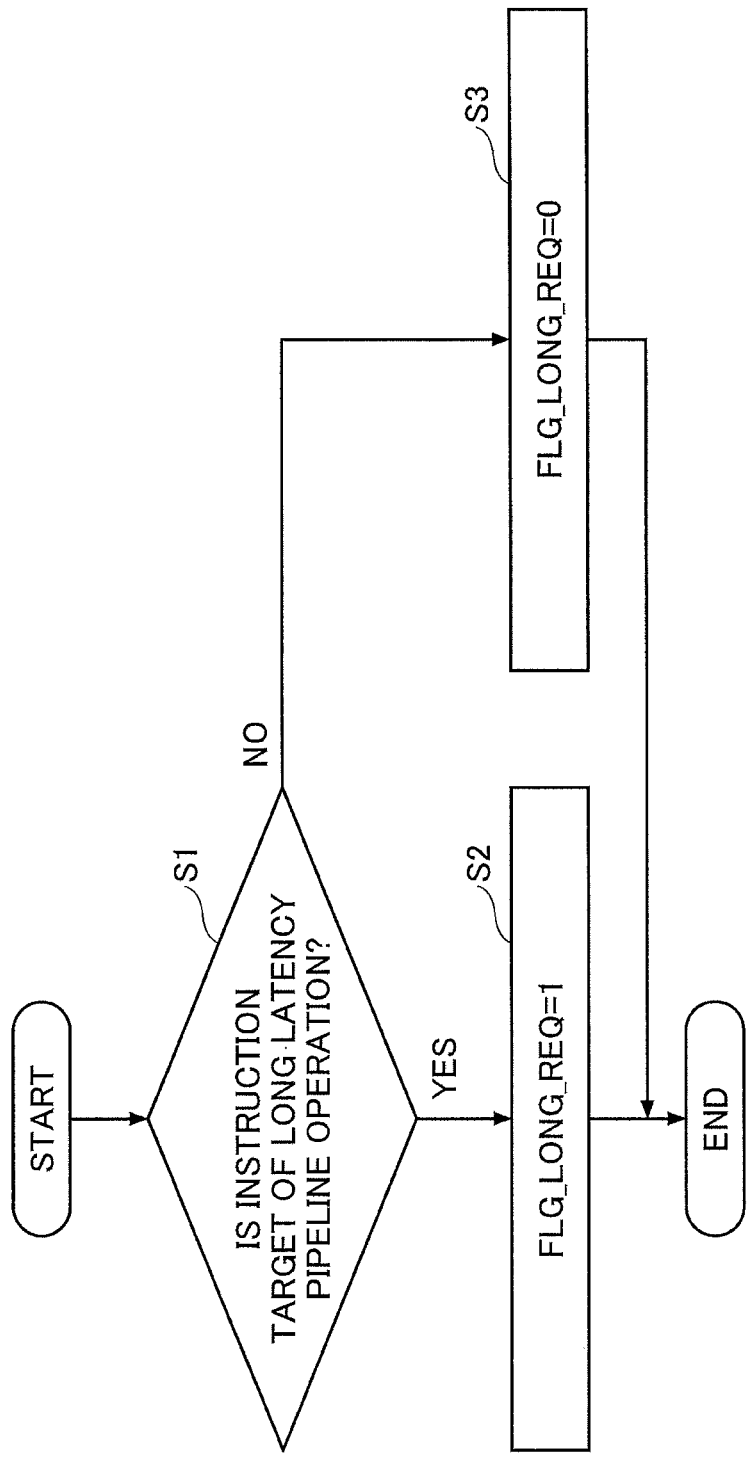
FIG. 8 is a flowchart illustrating an example of a determination process performed by a determination circuit.

FIG. 8 is a flowchart illustrating an example of a determination process performed by the determination circuit 21. In FIG. 8 and subsequent figures, an order in which the steps illustrated in the flowchart are performed is only an example, and the scope of the disclosed technology is not limited to the described execution order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place an obvious alternative case as described above outside the scope of the disclosed technology. Such an obvious alternative case inevitably falls within the scope of the technology intended by this disclosure.

In step S1 in FIG. 8, the determination circuit 21 determines whether a request is a target of the long latency pipeline operation. When the request is the target, the determination circuit 21 sets the long latency request flag FLG_LONG_REQ to 1 in step S2. When the request is not the target, the determination circuit 21 sets the long latency request flag FLG_LONG_REG to 0 in step S3.

After the determination by the determination circuit 21, a new port for the request is prepared in the fetch port 23. For example, up to forty ports are provided to the fetch port 23, and each port can be identified by an identifier. Upon receiving a new request, an unused port is assigned to the request and data of the request is stored in the assigned port. At the same time, a long latency request flag FLG_LONG_REQ may be stored in the port with the request. Information stored in ports of the fetch port 23 is used to manage whether execution of each instruction is completed.

The pipeline input request selection circuit 22 selects either a request that the instruction issue circuit 10 newly issues or a request that the fetch port 23 re-inputs to the pipeline as an instruction to be input to the pipeline. Basically, a request to be re-input is selected with higher priority, and a new request is selected only when there is no request to be re-input. A target of a request that the fetch port 23 re-inputs includes an instruction that is executed but that is incomplete for any reason, and an instruction that is not executed and that is in a state of waiting.

The collision prediction circuit 25 receives information indicating a pipeline processing state as an input from the pipeline stage control circuit 26, and predicts whether a collision occurs with respect to an instruction that is newly input to the pipeline. The information indicating the pipeline processing state may be information indicating which pipeline stage is in execution with respect to a short latency operation or a long latency operation executed in the pipeline, or both. When the collision prediction circuit 25 predicts a collision occurrence, the collision prediction circuit 25 asserts a long latency force request signal FRC_LONG (i.e., sets a long latency force request signal FRC_LONG to 1) with respect to a request being newly input to the pipeline. When the long latency force request signal FRC_LONG is asserted, a targeted request is forcibly performed as the long latency pipeline operation.

The selection circuit 24 selects either the short latency pipeline operation or the long latency pipeline operation for executing a request selected by the pipeline input request selection circuit 22. When the short latency pipeline operation is selected, the selection circuit 24 asserts a short latency selection signal SHORT_VAL (i.e., sets a short latency selection signal SHORT VAL to 1). When the long latency pipeline operation is selected, the selection circuit 24 asserts a long latency selection signal LONG_VAL (i.e., sets a long latency selection signal LONG_VAL to 1). As illustrated in FIG. 4 and FIG. 5, the selection is performed in the stage P of the pipeline.

Figure 9:
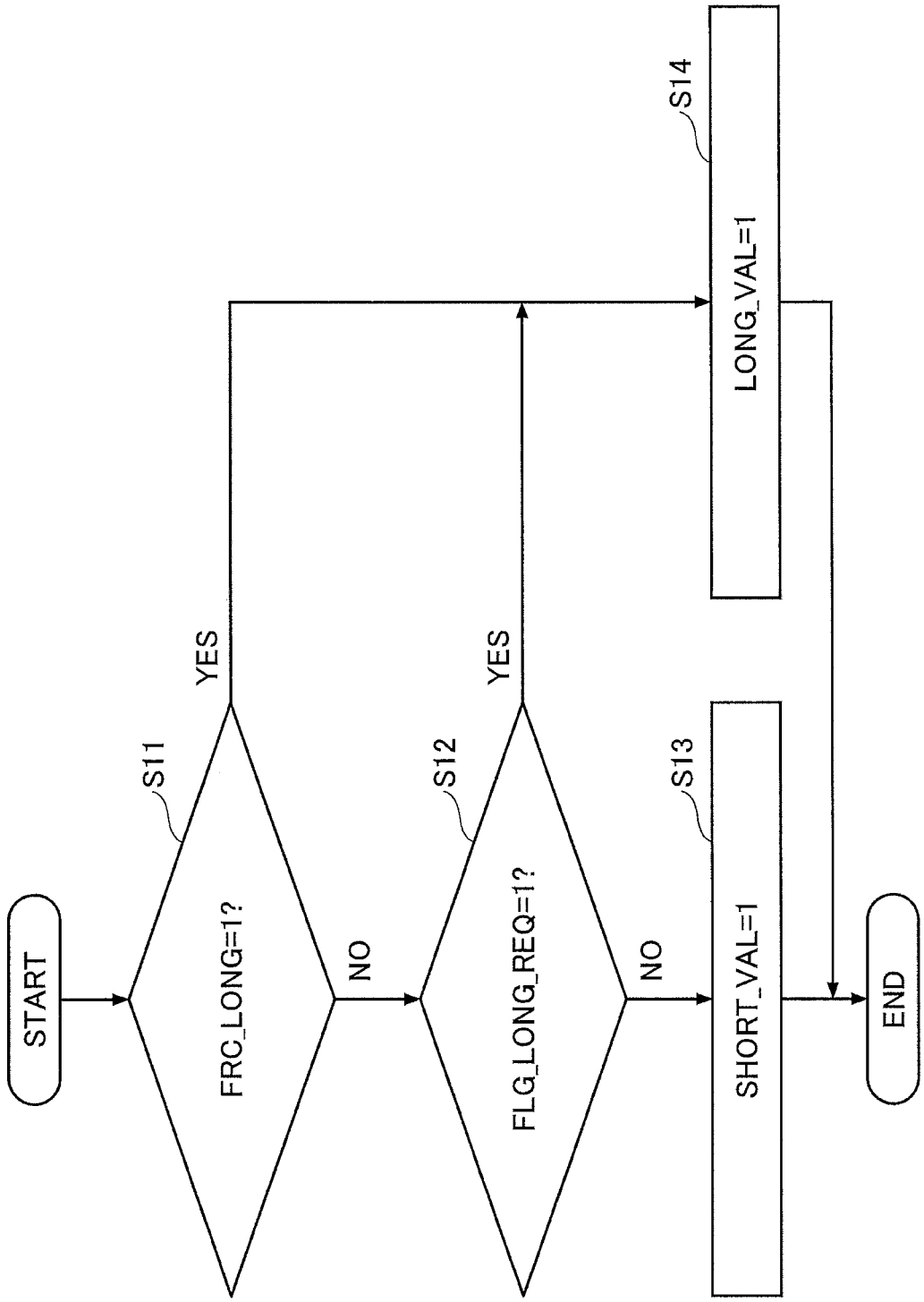
FIG. 9 is a flowchart illustrating an example of a selection process performed by a selection circuit.

FIG. 9 is a flowchart illustrating an example of a selection process performed by the selection circuit 24. In step S11, the selection circuit 24 determines whether the long latency force request signal FRC_LONG created by the collision prediction circuit 25 is 1. When the long latency force request signal FRC_LONG is not 1, the selection circuit 24 determines whether the long latency request flag FLG_LONG_REQ created by the determination circuit 21 is 1 in step S12. When the long latency request flag FLG_LONG_REQ is not 1, the selection circuit 24 sets the short latency selection signal SHORT_VAL to 1 in step S13. When either the long latency force request signal FRC_LONG or the long latency request flag FLG_LONG_REQ is 1, the selection circuit 24 sets the long latency selection signal LONG_VAL to 1 in step S14.

Figure 10:
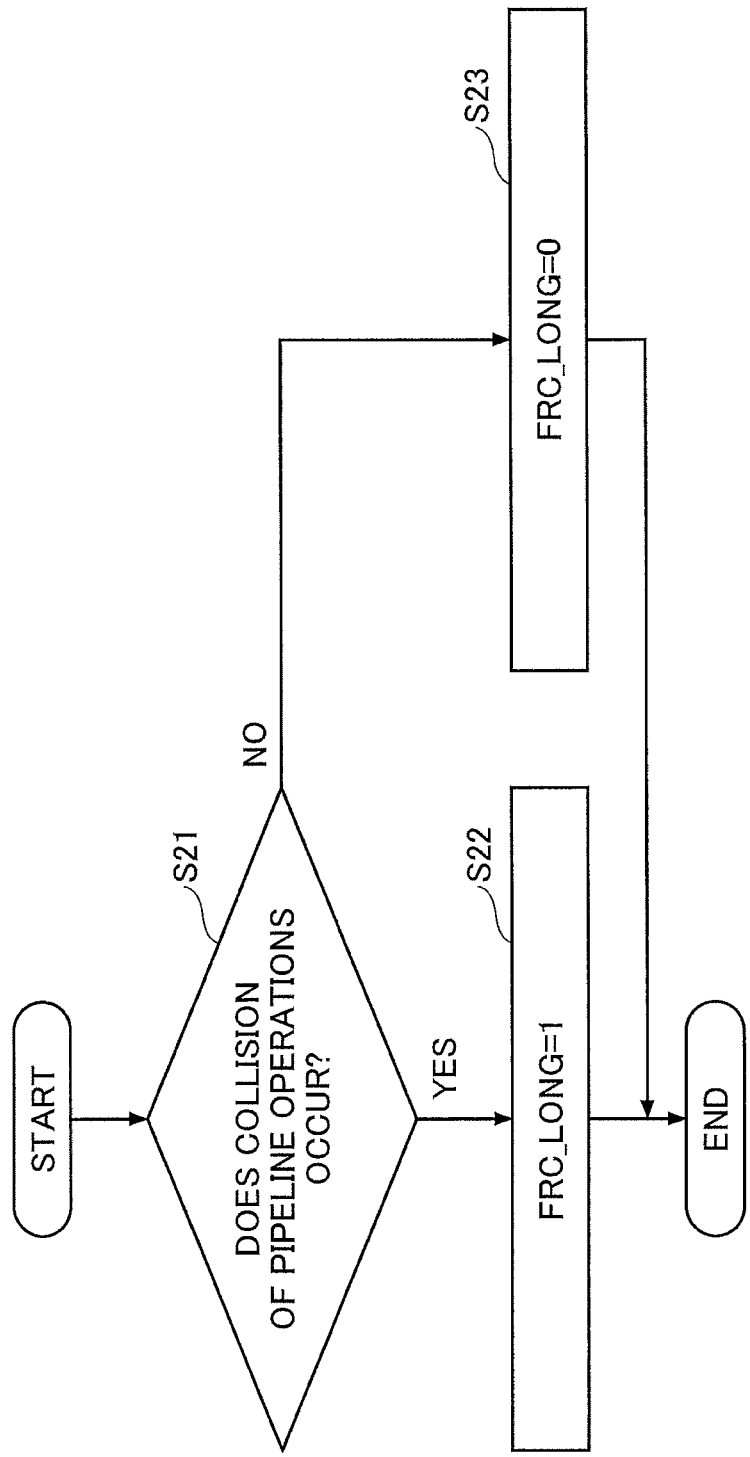
FIG. 10 is a flowchart illustrating an example of a process performed by a collision prediction circuit.

FIG. 10 is a flowchart illustrating an example of a process performed by the collision prediction circuit 25. In step S21, the collision prediction circuit 25 determines whether a collision of pipeline operations will occur. When the collision prediction circuit 25 determines that the collision will occur, the collision prediction circuit 25 sets the long latency force request signal FRC_LONG to 1 in step S22. When the collision prediction circuit 25 determines that the collision will not occur, the collision prediction circuit 25 sets the long latency force request signal FRC_LONG to 0 in step S23.

There are several patterns of the collision of pipeline operations. An example is a collision of accessing the data circuit upon two requests of reading from the data circuit. It is assumed that at the timing when a reading operation of the long latency pipeline is currently performed at the stage B (which is illustrated in FIG. 5), a reading operation of the short latency pipeline is started at the stage P (which is illustrated in FIG. 4). In this case, an access to the data circuit 31 by the reading operation of the long latency pipeline at the stage XM collides with an access to the data circuit 31 by the reading operation of the short latency pipeline at stage M.

Figure 11:
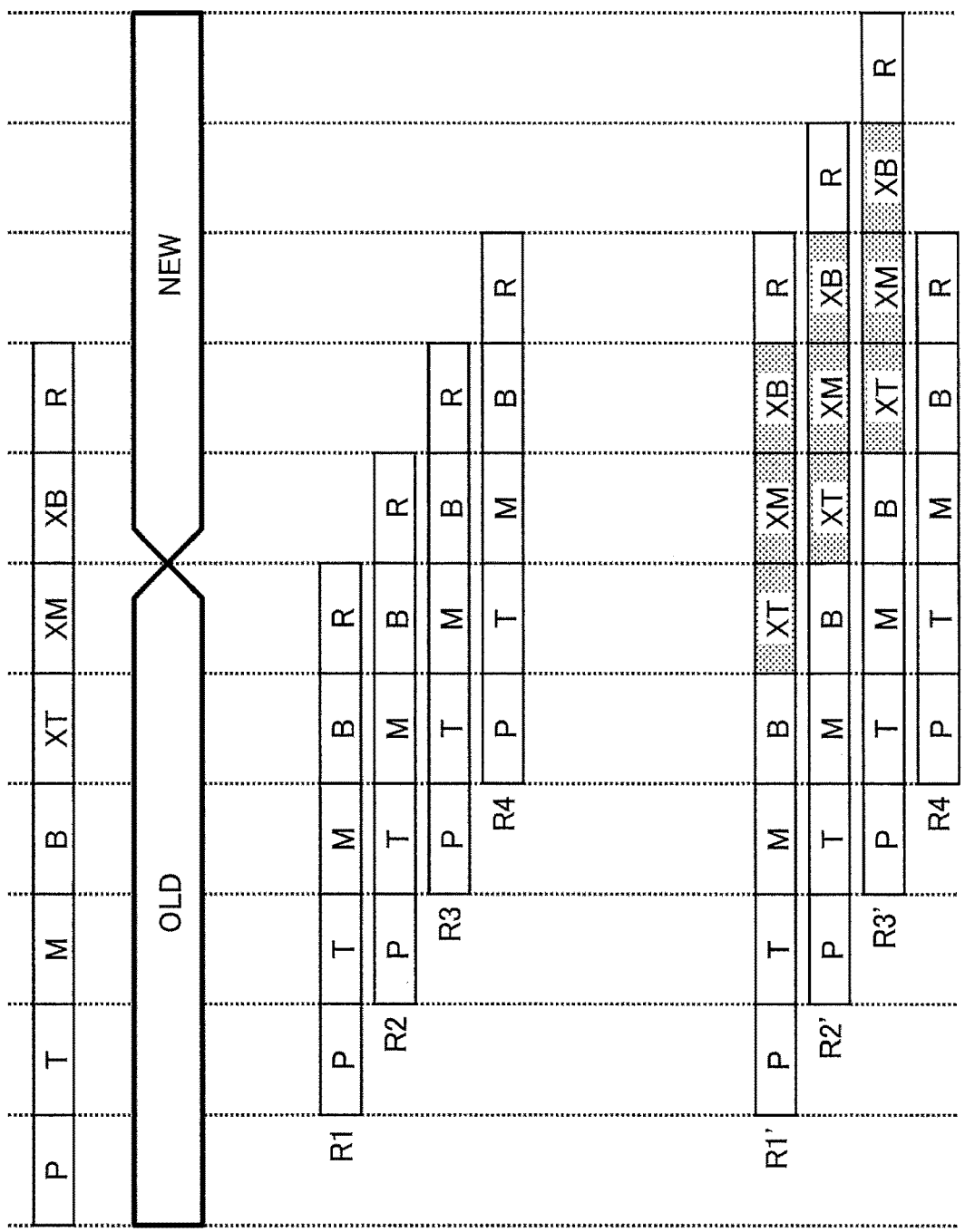
FIG. 11 is a drawing illustrating a state of a collision between a writing operation to a data circuit and a reading operation from a data circuit.

Another example of the collision of pipeline operations is a collision between a writing operation to the data circuit and a reading operation from the data circuit. FIG. 11 is a drawing illustrating a state of the collision between a writing operation to the data circuit and a reading operation from the data circuit As illustrated in (a) of FIG. 11, a preceding writing request to an address A is being executed as the long latency pipeline operation. The writing request is a request to update a memory value at a specific address in the data circuit, and the memory value at the address A is updated by accessing the data circuit at the stage XM. In (b) of FIG. 11, a change of the memory value at the address A by updating the memory value is illustrated.

In (c) of FIG. 11, four subsequent reading requests from the same address A, which are from R1 to R4, are illustrated, and the four requests are executed sequentially as the short latency pipeline operation. At this time, the reading requests from R1 to R3 read data by accessing the data circuit at the stage M, and although the pipeline operations of the requests from R1 to R3 are started after the preceding writing request illustrated in (a) of FIG. 11, a memory value OLD that is a value before updating is read. In order to avoid it, at the timing when a reading request is to be executed at the stage P, when a preceding writing request of long latency is executed at one of the stage T, the stage M, and the stage B, it is preferable that the reading request is executed in the long latency pipeline. Thus, it is preferable that the collision prediction circuit 25 sets the long latency force request signal FRC_LONG to 1.

In (d) of FIG. 11, four subsequent reading requests from the address A, which are requests from R1' to R3' and a request R4, are illustrated. The requests from R1' to R3' are executed sequentially as the long latency pipeline operation in accordance with an assertion of the long latency force request signal FRC_LONG, and the request R4 is executed as the short latency pipeline operation. As the reading requests from R1' to R3' read data by accessing the data circuit at the stage XM, a memory value NEW that is a value after updating can be read.

As described, a request which is predicted to collide is executed as the long latency pipeline operation regardless of a value of the long latency request flag FLG_LONG_REG. This can prevent a collision between the stage M of the short latency pipeline operation and the stage XM of the long latency pipeline operation (including a case where data is inconsistent). For a collision other than the two examples described above, such a collision may be appropriately incorporated in a collision prediction of the collision prediction circuit 25.

After the selection of the selection circuit 24, execution of the request on the pipeline is started. The pipeline stage control circuit 26 controls and manages execution of the pipeline.

Figure 12:
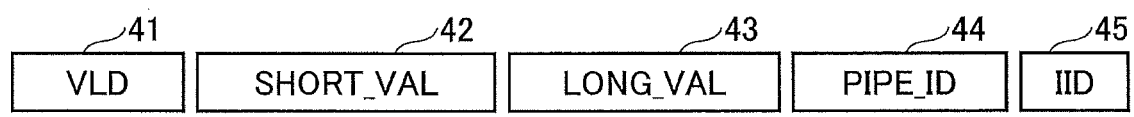
FIG. 12 is a drawing illustrating an example of the configuration of a pipeline stage control circuit.

FIG. 12 is a drawing illustrating an example of the configuration of the pipeline stage control circuit 26. The pipeline stage control circuit 26 includes a pipeline management register in order to manage a pipeline processing state for each stage. FIG. 12 illustrates an example of the pipeline management registers provided to one stage. The pipeline management register may include a register 41 storing a stage validate signal VLD, a register 42 storing the short latency selection signal SHORT_VAL, and a register 43 storing the long latency selection signal LONG_VAL. Furthermore, the pipeline management register may include a register 44 storing a pipeline identifier PIPE_ID that indicates either a writing request RD or a reading request RD, and a register 45 storing the identifier IID that distinguishes reading requests. In addition to these registers, other registers may be included.

FIG. 13 is a timing chart illustrating transition of data stored in the pipeline management registers. This is an example of a case when three requests from R1 to R3 illustrated in the upper part of FIG. 13 flow through the pipeline successively. The request R1 is a reading request that is a target of the short latency pipeline operation and an identifier IID of the request R1 is "1". The request R2 is a writing request that is a target of the long latency pipeline operation. The request R3 is a reading request that is a target of the long latency pipeline operation, and an identifier IID of the request R3 is "2".

The lower part of FIG. 13 illustrates a value stored in each register of the pipeline management registers at the stage P, the stage B, the stage XT, and the stage R. The other stages, which are the stage T, the stage M, the stage XM and the stage XB, are not illustrated in FIG. 13.

As an example, each register value at the stage P is described in the following. At the timing when one of three requests from R1 to R3 illustrated in the upper part of FIG. 13 is at the stage P, a value of a register storing the stage valid signal VLD is high. At the timing when the request R1 that is executed in the short latency pipeline operation is at the stage P, a value of a register storing the short latency selection signal SHORT_VAL (i.e., a SHORT_VAL register value) is high. At the timing when the request R2 or R3 that is executed in the long latency pipeline operation is at the stage P, a value of a register storing the long latency selection signal LONG_VAL (i.e., a LONG_VAL register value) is high. At the timing when the requests R1 and R3 that are reading requests are at the stage P, a value of a register storing the pipeline identifier PIPE_ID indicates the reading request RD. At the timing when the request R2 that is a writing request is at the stage P, a value of a register storing the pipeline identifier PIPE_ID indicates the writing request WT. At the timing when the requests R1 and R3 that are reading requests are at the stage P, identifiers IID that distinguish reading requests are "1" and "2", respectively.

Similarly for a given stage among the other stages, at the timing when one of three requests from R1 to R3 is at the given stage, a value of each pipeline management register is a value corresponding to a request. As the stages XT, XM, and XB are dedicated stages for the long latency pipeline operation, the stages do not have a register storing the short latency selection signal SHORT_VAL.

The pipeline operations are controlled and managed based on the pipeline management registers of the pipeline stage control circuit 26 which are described above. For example, the collision prediction circuit 25 can determine whether a reading request of the long latency pipeline operation is executed at the stage B by referring to a value of the LONG_VAL register at the stage B.

Under the pipeline stage control circuit 26, the pipeline processing is performed by operations of the data circuit access address generation circuit 28, the TLB 29, the tag circuit 30, the data circuit 31, the tag match determination circuit 32, and the way selection circuit 33, which are illustrated in FIG. 1. The data circuit 31 is accessed at the stage M of the short latency pipeline operation and at the stage XM of the long latency pipeline operation. At this time, the data circuit access address generation circuit 28 generates an access address ACC_ADRS for each RAM included in the data circuit 31. The data circuit access address generation circuit 28 takes input of a request access address ADRS, a SHORT_VAL register value of the stage M, a LONG_VAL register value of the stage XM, and a tag determination result WAY_ID that the tag match determination circuit 32 outputs. The data circuit access address generation circuit 28 generates the access addresses ACC_ADRS when the SHORT_VAL register value of the stage M is effective (i.e., high) so as to read consecutive 16 bytes data from each way. The data circuit access address generation circuit 28 generates the access addresses ACC_ADRS when the LONG_VAL register value of the stage XM is effective (i.e., high) so as to read consecutive 64 bytes data from a way indicated by the tag determination result WAY_ID.

After reading data from the data circuit 31, only data of one way specified by the tag determination result is selected at the stage B of the short latency pipeline operation. This operation is performed by the way selection circuit 33. The way selection circuit 33 takes input of data output from the data circuit 31, the SHORT_VAL register value at the stage B, the LONG_VAL register value at the stage XB, and the tag determination result WAY_ID. The way selection circuit 33 selects and outputs only data of a way indicated by the tag determination result WAY_ID from data of all ways read from the data circuit 31 when the SHORT_VAL register value at the stage B is effective. The way selection circuit 33 does not select data, and outputs data read from the data circuit 31 without any changes when the LONG_VAL register value at the stage XB is effective. The data output from the way selection circuit 33 is provided to the arithmetic circuit 11.

When the operations above are completed successfully, the completion determination circuit 27 generates a completion notification of the request, and sends the completion notification to the instruction issue circuit 10. When the pipeline processing is stopped for any reason such as cache miss, for example, the completion determination circuit 27 determines that a given request is incomplete, and the given request is sent back to the fetch port 23. The given request that is sent back to the fetch port 23 is re-executed as a re-input request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An arithmetic processing apparatus, comprising:
   an instruction issue circuit configured to issue an instruction;
   an arithmetic circuit configured to perform an arithmetic operation on data having a first data width and perform an instruction in parallel on each element of data having a second data width that is larger than the first data width; and
   a cache memory configured to store data,
   wherein the cache memory includes
   a tag circuit configured to store a plurality of tags for a plurality of respective ways;
   a data circuit configured to store a plurality of data for the plurality of respective ways;
   a determination circuit configured to determine a type of the instruction with respect to whether data accessed by the instruction that the instruction issue circuit issues has the first data width or the second data width; and
   a control circuit configured to selectively perform either a first pipeline operation in which the tag circuit and the data circuit are accessed in parallel or a second pipeline operation in which the data circuit is accessed in accordance with a tag determination result after accessing the tag circuit, on a basis of a result determined by the determination circuit.

2. The arithmetic processing apparatus as claimed in claim 1, further comprising a collision prediction circuit configured to predict a collision between the first pipeline operation to be executed for a first instruction and the second pipeline operation to be executed for a second instruction that precedes the first instruction, when the result indicates an execution of the first pipeline operation for the first instruction, wherein the control circuit causes to execute the second pipeline operation for the first instruction when the collision prediction circuit predicts the collision.

3. The arithmetic processing apparatus as claimed in claim 2, wherein the cache memory further includes an address generation circuit configured to generate an address for accessing the data circuit so as to access the data circuit with the first data width in the first pipeline operation and access the data circuit with the second data width in the second pipeline operation.

4. The arithmetic processing apparatus as claimed in claim 3, wherein the cache memory further includes a way selection circuit configured to select and output data of one way from data of the plurality of ways read from the data circuit in accordance with a tag determination result in the first pipeline operation and output all data of one way read from the data circuit in the second pipeline operation.

5. The arithmetic processing apparatus as claimed in claim 2, wherein the cache memory further includes a way selection circuit configured to select and output data of one way from data of the plurality of ways read from the data circuit in accordance with a tag determination result in the first pipeline operation and output all data of one way read from the data circuit in the second pipeline operation.

6. The arithmetic processing apparatus as claimed in claim 1, wherein the cache memory further includes an address generation circuit configured to generate an address for accessing the data circuit so as to access the data circuit with the first data width in the first pipeline operation and access the data circuit with the second data width in the second pipeline operation.

7. The arithmetic processing apparatus as claimed in claim 6, wherein the cache memory further includes a way selection circuit configured to select and output data of one way from data of the plurality of ways read from the data circuit in accordance with a tag determination result in the first pipeline operation and output all data of one way read from the data circuit in the second pipeline operation.

8. The arithmetic processing apparatus as claimed in claim 1, wherein the cache memory further includes a way selection circuit configured to select and output data of one way from data of the plurality of ways read from the data circuit in accordance with a tag determination result in the first pipeline operation and output all data of one way read from the data circuit in the second pipeline operation.

9. A memory apparatus, comprising:
   a tag circuit configured to store a plurality of tags for a plurality of respective ways;
   a data circuit configured to store a plurality of data for the plurality of respective ways;
   a determination circuit configured to determine a type of an instruction with respect to a data width of data accessed by the instruction; and
   a control circuit configured to selectively perform either a first pipeline operation in which the tag circuit and the data circuit are accessed in parallel or a second pipeline operation in which the data circuit is accessed in accordance with a tag determination result after accessing the tag circuit, on a basis of a result determined by the determination circuit.

10. A method of controlling an arithmetic processing apparatus, wherein the arithmetic processing apparatus includes an instruction issue circuit, an arithmetic circuit configured to perform an arithmetic operation on data having a first data width and perform an instruction in parallel on each element of data having a second data width that is larger than the first data width, and a cache memory configured to include a tag circuit configured to store a plurality of tags for a plurality of respective ways and a data circuit configured to store a plurality of data for the plurality of respective ways, the method comprising:
   issuing an instruction by the instruction issue circuit;
   determining, by a determination circuit included in the cache memory, a type of the instruction with respect to whether data accessed by the instruction that the instruction issue circuit issues has the first data width or the second data width; and
   selectively performing, by a control circuit included in the cache memory, either a first pipeline operation in which the tag circuit and the data circuit are accessed in parallel or a second pipeline operation in which the data circuit is accessed in accordance with a tag determination result after accessing the tag circuit, on a basis of a result determined by the determination circuit.

\* \* \* \* \*